United States Patent
Day, Jr.

[15] 3,697,145
[45] Oct. 10, 1972

[54] BEARING RETAINER
[72] Inventor: John W. Day, Jr., Seattle, Wash.
[73] Assignee: Sealth Aero Marine Company, Seattle, Wash.
[22] Filed: Dec. 18, 1970
[21] Appl. No.: 99,455

[52] U.S. Cl. ................................................308/72
[51] Int. Cl. ............................................F96c 23/04
[58] Field of Search.....................308/15, 236, 22, 72

[56] References Cited

UNITED STATES PATENTS

| | | | |
|---|---|---|---|
| 1,556,875 | 10/1925 | Ormsby | 308/236 |
| 1,912,023 | 5/1923 | Tyson | 308/236 |
| 1,928,690 | 10/1933 | Hohnhorst et al. | 308/236 |

Primary Examiner—Martin P. Schwadron
Assistant Examiner—Frank Susko
Attorney—Theron H. Nichols

[57] ABSTRACT

A bearing retainer is disclosed for removably or detachably mounting a bearing in a fixed structure comprising a bushing having a pair of external and a pair of internal locking means or flanges thereon, one locking flange of each pair being on a ring which is detachable for releasably mounting the bearing in the bushing and for removably mounting the bushing in the structure for providing a reliable and economical bearing retainer for easily removing and replacing a bearing without requiring special tools, and yet providing high axial load carrying capabilities for both bearing and bearing retainer regardless of the number of replacements.

7 Claims, 2 Drawing Figures

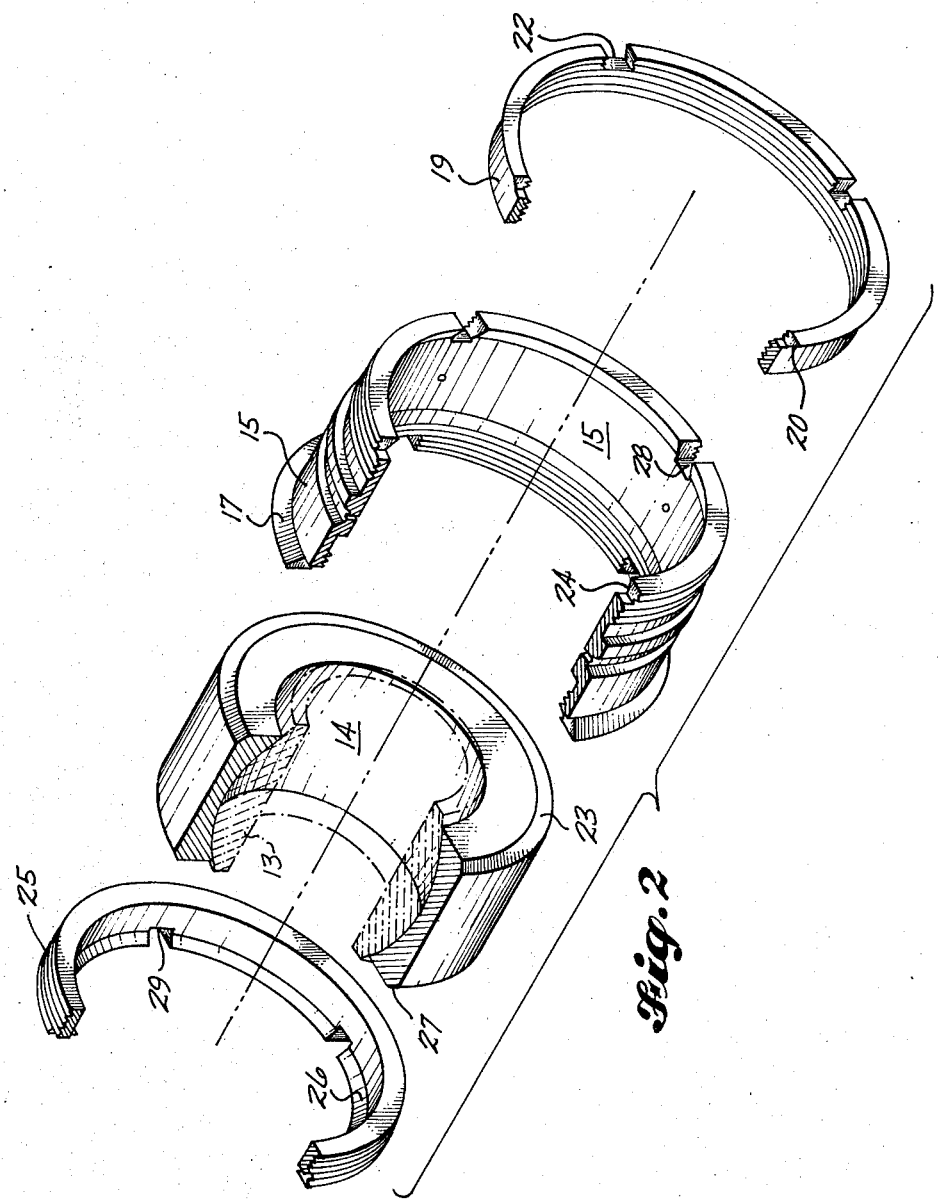
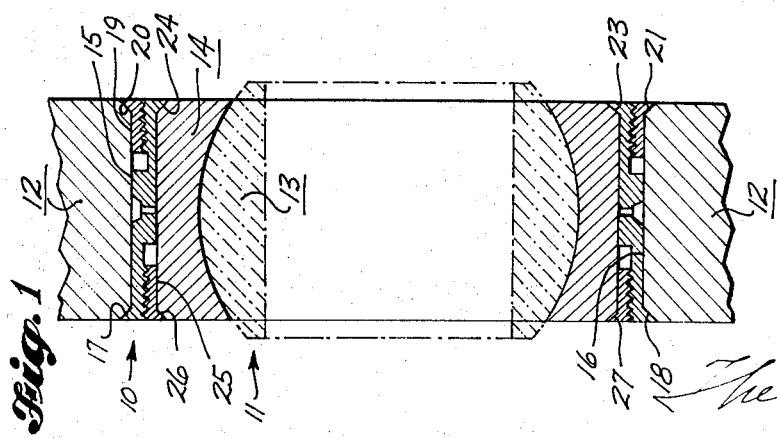
INVENTOR,
JOHN W. DAY JR.
BY
Trevor H. Nichols
AGENT

BEARING RETAINER

Likewise methods for removably mounting a bearing in a bearing retainer and for removably mounting a bearing in an opening in a fixed structure are disclosed, the former method comprising the steps of (1) forming locking means internally of one end of the bearing retainer for locking the bearing at said one end against axial movement in one direction, and (2) forming removable locking means internally of the other end of the bearing retainer for locking the bearing at said other end against axial movement in the other direction. The latter method comprises the steps of (1) snugly positioning a bearing retainer in the opening having two locking means for securing the retainer in the opening, (2) forming one of the locking means detachable for easy removability of the retainer from the structure, (3) snugly inserting the bearing in the bearing retainer, (4) forming two locking means on the retainer for locking the bearing internally of the bearing retainer, and (5) forming one of the two latter locking means detachable for easy removability of the bearing from the bearing retainer for providing an easily removable and replaceable bearing while maintaining high axial load carrying capabilities.

SUMMARY OF THE INVENTION

The conventional method of securing a bearing in a structure is by maching or forming of the parts wherein the structure is swaged or formed about the bearing or the bearing is swaged about the structure with special tools in a known manner whereby upon removal of the bearing by pressing or working, then bending, working, or warping of the structure and bearing results with inevitable weakening, distorting, and damaging thereof. The disclosed bearing retainer comprises a thin wall bushing, such as but not limited to a stainless steel bushing having two external locking means for preventing axial movement of the bearing retainer in the opening in the fixed structure, one locking means being a flange integral with the outer peripheral surface of one end of the bushing for contacting a camfered edge on one side of the fixed structure and the other locking means being an internally threaded locking ring for screwing on the threaded outer peripheral surface of the other end of the bushing and having a flange for contacting a camfered edge on the other side of the fixed structure. Thus after sliding the bushing in the opening in the fixed structure until the integral flange is snug against one side of the fixed structure, the internally threaded locking ring is firmly screwed on the outer peripheral surface of the other end of the bushing for removably securing or locking the bearing retainer in the fixed structure.

The bearing is inserted internally of the bushing until positioned snugly against a locking means or flange integral with the internal peripheral surface of one end of the bushing for preventing axial movement of the bearing in the bushing in one direction. A second and removable locking means comprising an externally threaded locking ring with an internal integral flange is screwed on or threaded on the internal peripheral surface of the other end of the busing for removably locking the bearing in the bearing retainer.

Two methods are disclosed for removably mounting a bearing. One method for removably mounting a bearing in a bearing retainer comprises the steps of (1) forming locking means internally of one end of the bearing retainer, (2) inserting the bearing internally of the retainer snugly against the locking means for the prevention of axial movement in one direction, and (3) forming removable locking means internally on the peripheral surface of the other end of the retainer for releasably locking the bearing against axial movement in the other direction.

Another method disclosed is a method for removably mounting a bearing in an opening in a fixed structure comprising the steps of, (1) inserting a bearing retainer snugly in the opening of the fixed structure having two locking means for securing both ends of the retainer in the sides of the opening, (2) forming one of the two locking means detachable for easy removability of the retainer from the fixed structure, (3) inserting the bearing snugly in the bearing retainer, (4) forming two locking means on the retainer for locking the bearing internally of the retainer, and (5) forming one of the two latter locking means detachable for easy removability of the bearing from the bearing retainer for providing an easily removable and replaceable bearing while maintaining high axial load carrying capabilities.

Accordingly a principal object of this invention is to provide a bearing retainer that will releasable mount a bearing without requiring special tools and which will maintain high axial load carrying capabilities regardless of the number of replacements.

Another principal object of this invention is to provide a bearing retainer for mounting a bearing therein having a pair of locking means for releasably securing the bearing retainer in a fixed structure and a pair of locking means for releasably securing the bearing in the bearing retainer in an economical and reliable manner.

A further object of this invention is to provide a method for releasably mounting a bearing in a bearing retainer while maintaining high axial load carrying capabilities.

Another object of this invention is to provide a method for releasably mounting a bearing retainer, with a bearing therein, in a fixed structure in an economical and reliable manner while maintaining high axial load carrying capabilities.

Other objects and various advantages of the disclosed bearing retainer and methods of releasably mounting a bearing will be apparent from the following detailed description, together with the accompanying drawings, submitted for purposes of illustration only and not intended to define the scope of the invention, reference being made for that purpose to the subjoined claims.

BRIEF DESCRIPTIONS OF THE DRAWINGS

The drawings diagrammatically illustrate by way of example, not by way of limitation, one from of the invention wherein like reference numerals designate corresponding parts in the several views in which:

FIG. 1 is schematic cross-sectional view of a bearing releasably mounted in the new bearing retainer and wherein the retainer is releasably mounted in fixed structure, and FIG. 2 is an exploded schematic of the bearing and bearing retainer with its locking rings.

DESCRIPTION OF THE PREFERRED EMBODIMENT

The invention disclosed herein is not limited in this application to the details of construction and arrangement of parts shown and described, since the invention is capable of other embodiments and of being practiced or carried out in various other ways. Also it is to be understood that the phraseology or terminology employed herein is for the purpose of description and not of limitation.

FIG. 1 illustrates schematically a cross-sectional view of the assembled bearing retainer 10 with a conventional bearing 11 releasably mounted therein, and a housing or fixed structure 12 in which is releasably mounted the bearing retainer. The bearing 11 comprises a ball 13 rotatably mounted in race 14.

FIG. 2 illustrates schematically an exploded view of the bearing retainer 10 and race 14 of the bearing 11.

As shown in FIG. 1, the bearing retainer 10 comprises a bushing 15 snugly slid, from left to right into opening 16 into fixed structure 12 until the flange 12, which is integral with the outer peripheral surface of one end of the bushing contacts the camfered edge 18 of the fixed structure, and locks the bushing against further movement to the right in the opening 16. Then a locking ring 19 having internal threads for screwing on external threads on the outer peripheral surface of the other end of the bushing is threaded on the bushing until a flange 20 integral with the outer surface of the locking ring contacts and is snugly pressed against another camfered edge 21 on the opening 16 of the fixed structure for locking the bushing against movement to the left. A conventional wrench fitting in radial grooves 22, FIG. 2, is utilized to tighten locking ring 19 on the bushing 15. Thus the bearing retainer 10, FIG. 1, is releasably connected or removably mounted in the opening 16 of fixed structure 12.

Bearing 11, FIG. 1, comprising ball 13 mounted in race 14 may then be inserted internally of bushing 15, from left to right, until the camfered edge 23 of race 14 is abutting against internal locking flange 24 integral with the internal peripheral surface of the other end of the bushing 15. Finally externally threaded locking ring 25 is screwed on the internal peripheral surface of the left or first end of the bushing 15 until a locking flange 26 which is integral with the internal surface of locking ring 25 contacts and presses against the camfered edge 27 on the bearing race 14. With a conventional wrench in radial grooves 28, FIG. 2, in the bushing 15 and a wrench in radial grooves 29 in the locking ring 25, the locking ring is tightened on the bushing.

Thus, the bearing 11, FIG. 1, is releasably mounted in the bearing retainer 10, which in turn is releasably mounted in fixed structure 12.

Likewise, two methods are disclosed for removably mounting a bearing. The first method comprises the three steps of (1) forming locking means internally of one end of the bearing retainer, (2) inserting the bearing internally of the retainer snugly against the locking means for the prevention of axial movement in one direction, and (3) forming removable locking means integrally on the peripheral surface of the other end of the retainer for releasably locking the bearing against axial movement in the other direction.

The second method comprises the five steps of (1) inserting a bearing retainer snugly in the opening of the fixed structure having two locking means for securing both ends of the retainer in the sides of the opening, (2) forming one of the two locking means detachable for easy removability of the retainer from the fixed structure, (3) inserting the bearing snugly in the bearing retainer, (4) forming two locking means on the retainer for locking the bearing internally of the retainer, and (5) forming one of the two latter locking means detachable for easy removability of the bearing from the bearing retainer for providing an easily removable and replaceable bearing while maintaining high axial load carrying capabilities.

Accordingly a new bearing retainer and two methods for mounting a bearing have been disclosed in a manner which meets each of the objects set forth above.

While only one embodiment and two methods of the invention have been shown in the accompanying specification and drawings, it will be evident that various other modifications and methods are possible in the arrangement and construction of the disclosed bearing retainer and methods of releasably mounting a bearing without departing from the scope of the invention, and it is accordingly desired to comprehend within the purview of this invention such modifications as may be considered to fall within the scope of the appended claims.

I claim:

1. A bearing retainer means mounted in an opening in a structure and preventing movement of a bearing from the structure in either one direction or the other direction axially of the opening comprising, a. bushing means having first external locking means and first internal locking means, b. said first external locking means preventing passage of said bushing means from the opening in said one direction, c. said bushing means receiving said bearing internally thereof and said first internal locking means preventing passage of said bearing from the bushing means in said one direction, d. second external locking ring means for mounting on said bushing means for preventing passage of said bushing means from the opening in said other direction and for releasing said bushing means for permitting passage thereof from said opening in said other direction, and e. second internal locking means for mounting on said bushing means for preventing passage of said bearing from the bushing means in said other direction for retaining and locking said bearing in said structure and for releasing said bearing for permitting passage thereof from said bushing means in said other direction for forming a removable bearing retainer means.

2. A bearing retainer means as recited in claim 1 wherein, a. said second external locking means is detachable from said bushing means for easy removability of said bushing means from said structure.

3. A bearing retainer means as recited in claim 2 wherein, a. said second detachable external locking means comprises a threaded ring having a ledge for screwing over one end of said bushing means with said ledge bearing against the structure for detachably locking said bushing means in the structure.

4. A bearing retainer means as recited in claim 1 wherein,
   a. said second internal locking means being detachable from said bushing means for easy removability of said bearing from said bushing means.

5. A bearing retainer means as recited in claim 4 wherein,
   a. said second detachable internal locking means being a threaded ring having a ledge bearing against the bearing for detachably locking said bearing in the bushing means.

6. A bearing retainer means as recited in claim 1 wherein,
   a. both said second external locking means and said second internal locking means being detachable from said bushing means for easy removability of said bushing means from the structure and said bearing from said bushing.

7. A bearing retainer means as recited in claim 1 wherein,
   a. both said first external locking means and said first internal locking means being integral with said bushing means.

* * * * *